United States Patent [19]

Zippe et al.

[11] Patent Number: 5,412,882
[45] Date of Patent: May 9, 1995

[54] METHOD AND HEAT-EXCHANGER FOR PREHEATING BROKEN GLASS AND GLASS-BATCHING MELT-GOODS OR SIMILAR BULK GOODS USING A HEATING GAS

[75] Inventors: Bernd H. Zippe, Kreuzwertheim; Erich Weis, Rauenberg; Hilmar Leichtenschlag, Eichenbuhl, all of Germany

[73] Assignee: Zippe, Gmbh & Co., Germany

[21] Appl. No.: 51,736

[22] Filed: Apr. 23, 1993

[30] Foreign Application Priority Data

Apr. 24, 1992 [DE] Germany .................. 42 13 481.1

[51] Int. Cl.⁶ ............................................. F26B 17/12
[52] U.S. Cl. ........................................ 34/521; 34/505
[58] Field of Search .................. 34/165, 166, 167, 168, 34/174, 176, 467, 505, 521

[56] References Cited

FOREIGN PATENT DOCUMENTS

3217414C1 7/1983 Germany .
3716687C1 11/1988 Germany .

Primary Examiner—Henry A. Bennet
Attorney, Agent, or Firm—Frank P. Presta

[57] ABSTRACT

As a rule a melt-good consisting of glass fragments and glass batching will be moist and tend to agglomerate and bridge-form when being preheated in a plate heat-exchanger 10 whereby the travel of the melt-good through the plate heat-exchanger 10 may be blocked. To remedy these drawbacks, the preheating stage is preceded by a drying stage of the moist melt-good. For that purpose, in the intake zone of the melt-good, the moisture of the melt-good is evaporated by means of a separate feed of hot heating gas into the already cooled flows of heating gas. At the same time the heated melt-good is made to pass through cavities 12 through which the steam may escape to the outside. Thereby condensation shall be precluded and only fluid or friable melt-good arrives at the preheating stage.

1 Claim, 3 Drawing Sheets

METHOD AND HEAT-EXCHANGER FOR PREHEATING BROKEN GLASS AND GLASS-BATCHING MELT-GOODS OR SIMILAR BULK GOODS USING A HEATING GAS

BACKGROUND OF THE INVENTION

The invention concerns a method for preheating melt-goods, i.e., materials to be molten, consisting of glass fragments and glass batching or such bulk goods, using a heating gas, wherein the melt-goods are vertically descending by gravity in a plurality of small columns and are preheated by heating-gas flowing in the opposite direction in the process of indirect heat-exchange, the temperature of the melt-goods columns increasing from the top toward the bottom whereas the temperature of the heating-gas flow gradually decreases from the bottom toward the top. The invention concerns also a plate heat-exchanger to carry out the method.

The German patent documents Nos. 32 17 414 C1 and 37 16 687 C1 disclose equipment, i.e., plate heat-exchangers, for carrying out the above stated method. Such known equipment operates in a problem-free manner as long as the bulk-goods to be preheated are dry, as in that case they will easily descend by gravity through the ducts of the equipment or plate heat-exchanger, without adhesion, caking or lastly clogging bridge-formation coming into being. This is also the case to some extent for broken glass when moist because enough hollows will form between the glass fragments to allow the steam generated during preheating to escape through the top of the equipment or plate heat-exchanger. If however the bulk or melt-goods to be preheated are moist glass fragments and moist or dry glass batching, and this shall be the rule, the above methods do fail. In such instances the dreaded adhesions and bridge-formations arise in the plate heat-exchanger and the downward flow of the goods to be preheated is interrupted, i.e., blocked. One of the reasons for such phenomena is steam produced from the basic moisture of the glass batching generated when heating this glass batching to above 100° C., i.e., when it is being preheated. Lastly the water of crystallization in the soda portion of the glass batching contributes to the generation of steam in the course of this preheating. Because evaporation only starts at a depth between about 1 and 2 m when preheating such bulk goods, then when charging broken glass and glass batching the steam no longer can escape upwardly from the charged material because latter acts like a stopper. As already mentioned, because of the steam condensing in the ducts of the plate heat-exchanger, bridges may be formed and hence blocking may arise. Known solutions to this problem are mechanically complex and expensive.

The German patent document No. 40 00 358 A1 discloses a method and a heat-exchanger for drying and pre-heating a melt-good consisting of glass fragments and glass batching, where one or only a few columns of the melt-good descending by gravity are transversely crossed by the heating gas: contrary to the initially cited method, this signifies direct contact with the heating gas. The steam so generated is evacuated laterally together with the flow of heating gas used for drying and preheating, without the steam condensing. However this method is not immediately applicable when a larger number of melt-good columns are involved which are hermetically sealed laterally and, because of gravity, migrate from top to the bottom and in the process are preheated by heating gas flowing in the opposite direction and (indirectly) by means of heat-exchange surfaces. An upper introduction means for the melt-good to be preheated is not heated and therefore is unutilized for drying, only enlarging the equipment height. However when the input material is moist, steam already may form in the transition zone between this introduction means and the preheating segment of this known equipment: it may condense and cause clogging.

SUMMARY OF THE INVENTION

The object of the invention is to ensure for a method of the initially cited kind that in the event of moist input, melt-goods, these can descend unhampered in small columns and shall not be blocked during such descent by bridges being formed, by agglomerations or the like.

The invention solves the above problem by a drying stage for moist melt-goods preceding the preheating operation, the moisture being evaporated in the drying stage within an intake zone of the melt-goods by means of a separate feed of hot heating gas to the already cooled flow of hot gas, and in that the melt-goods columns pass through cavities through which the steam escapes to the outside, as a result of which condensation is prevented and only dry melt-goods enter the preheating stage. By introducing a hot heating gas, preferably the exhaust gas from the glass-melting furnace, at about 600° C., into the melt-goods intake zone, the evaporation of the moisture entrained by such melt-goods, in particular of the glass batching, is already initiated at that stage and simultaneously the steam is exhausted from this region to the outside, whereby condensation is precluded. After the melt- or charge-goods have been dried in their intake zone they arrive in the dry, fluid or friable state at the preheating zone proper where they may descend by gravity in an unhampered manner and can be preheated in the process. The pre-drying stage offers the decisive significance of allowing the steam to flow outwardly through cavities located laterally off the melt-goods columns, but these cavities also may be formed within the melt-goods columns.

A plate heat-exchanger with a plurality of small vertical ducts open at the top and bottom and laterally spaced is used to carry out the above method, the ducts serving to transmit the melt-good by gravity, the cavities between the melt-goods receiving ducts serving to guide the hot gas, the exchanger further including a lower feed conduit and an upper exhaust conduit for the heating gas and evincing furthermore, when viewed from top toward the bottom, first a drying zone followed by the melt-goods preheating zone, the drying zone comprising means for introducing a hot heating gas into the heating-gas guide-cavities and also means with cavities to evacuate steam escaping from the melt-goods and mounted in the plate heat-exchanger transversely to the direction of displacement of the melt-goods and issuing at least by one end from the plate heat-exchanger.

Whereas the charged material forms so-to-speak stoppers in the narrow ducts for melt-goods transmission in the state of the art initially mentioned, whereby steam cannot escape through the top and hence its condensation is enhanced. In the invention, on the other hand, the steam is evacuated to the outside through cavities arranged transversely to the direction of motion of the melt-good. The hot heating gases fed to the drying zone are advantageously tapped from the main hot-gas feed line at the lower end of the plate heat-exchanger. The already cooled hot gases flowing through the plate heat-exchanger are mixed in the drying zone with the hot heating gas and thereby are raised to a temperature assuring evaporation of the moisture of the melt-goods in the drying zone.

In a further embodiment of the invention, the drying zone starts near the melt-goods receiving-end of the heat exchanger at a goods-depth of about 1–2 m. This depth is selected because the heating gases already have been cooled in this range and appropriately therefore water evaporation is initiated at this level by introducing suitably hot exhaust gases.

In yet a further embodiment of the invention, the means supplying hot heating gases and the means evacuating steam from the drying zone are mounted each directly next to the other in the vertical direction. The vertical size of the drying zone can be matched then to the particular requirements.

In still a further embodiment of the invention, the means evacuating steam from the drying zone appropriately comprise channel-shaped bodies open at their underside or perforated or slotted at the underside which issue at least by one end from the plate heat-exchanger.

The channel-shaped bodies for evacuating the steam from the drying zone can be arrayed in one or more vertical and mutually spaced planes.

Where the plate heat-exchanger consists of heat-exchanging units designed to be crossed horizontally by the heating gas and wherein the heating-gas guide-cavities of vertically adjacent heat-exchanger units are connected by externally mounted heating-gas bypass ducts, another embodiment of the invention provides that each hot heating-gas feed conduit issues into the upper part of the uppermost bypass duct or into the upper part of a few of the upper bypass ducts, and the channel-shaped bodies shall be advantageously integrated into their own intermediate units mounted between every two heat-exchanger units. The invention then is also advantageously applicable to a plate heat-exchanger consisting of superposed heat-exchanger units, the steam evacuation being carried out through channel-shaped bodies in the intermediate units. The lengths and widths of these intermediate units correspond to those of the heat-exchanger units but preferably shall be less. The hot heating gases mix with the already cooled heating gases in the bypass ducts and the mixture then is raised to a temperature assuring moisture evaporation in the drying zone.

Appropriately the steam-evacuating channel-shaped bodies are so integrated into their unit as to be always mounted between two evacuation cavities for the heating gas of vertically adjacent heat-exchanger units. Because of this design, the steam evacuation from the drying zone is carried out without thereby hampering the downward flow of the melt or bulk goods in the vertical ducts.

In still another embodiment mode of the invention, the steam-evacuating channel-shaped bodies consist of reversely mounted U-channels, V-bars, H-bars or shapes with similar cross-sections.

Appropriately the cross-sectional width of the H-bars essentially corresponds to that of the heating-gas evacuation-cavities which are vertically flush with the upper edges of the H-bars.

The descent of the melt or bulk goods in the plate heat-exchanger is further facilitated by integrating in a prone manner angle irons or shapes with a cross-section similar to the H-bars at vertical spacings from the H-bars and parallel to them, being flush with the H-bars, the legs or feet of such shapes forming guides for the melt-good flowing through the intermediate unit.

The invention is elucidated below in relation to the drawings of an illustrative embodiment.

DESCRIPTION OF THE PREFERRED EMBODIMENTS

Figure 1:
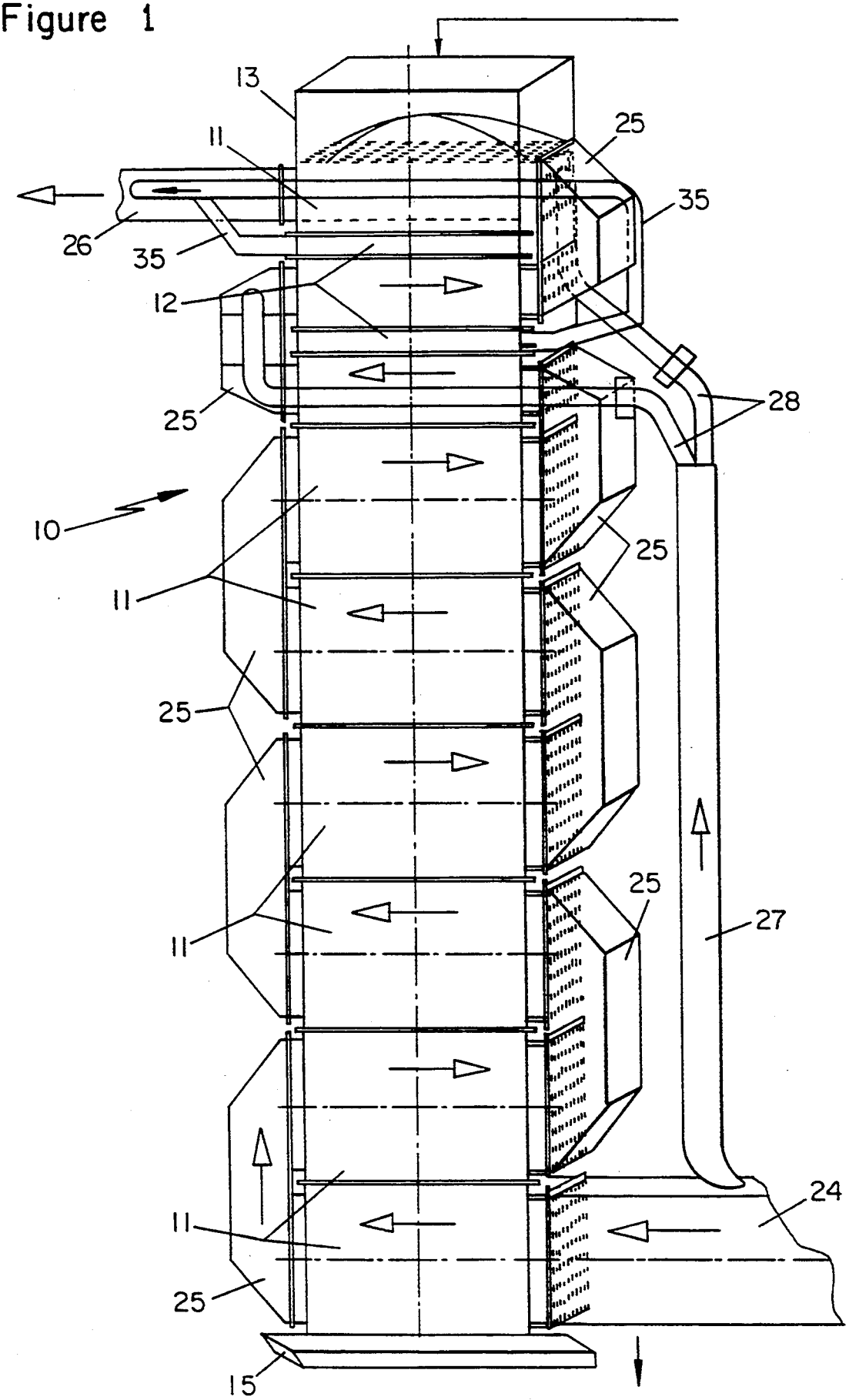
FIG. 1 is a schematic sideview of a plate heat-exchanger with a drying zone and a subsequent preheating zone for the melt-goods, the flow of the heating gas through the heat exchanger being denoted by the solid arrows and dot-dashed arrows indicating the steam exhaust from the heat exchanger.

The plate heat-exchanger 10 preheats a melt-good consisting of broken glass and glass batching before being introduced into a melting tub. The melt-good is preheated in the plate heat-exchanger 10° to several hundred °C. (depending on dwell time and quantity and temperature of the available heating gas); the heating gas preferably shall be the flue gas from the glass melting equipment.

The plate heat-exchanger 10 is modularly composed of heat-exchanger units 11. Illustratively in FIG. 1, nine vertically superposed heat-exchanger units 11 constitute the plate heat-exchanger 10. In this embodiment, intermediate units 12 are mounted between the three upper last heat-exchanger units 11: their function is discussed further below. The heat-exchanger units 11 are substantially identical, however the upper three illustratively are less in height. Again they are mutually connected in a substantially identical manner. An input or receiving shaft 13 for the melt-good to be preheated is affixed to the uppermost heat-exchanger unit 11. The preheated melt-good that has passed through the plate heat-exchanger 10 leaves the lowermost heat-exchanger unit 11 at its open underside through several funnel-shaped shafts 14 and drops onto chute-shaped vibration-conveyors 15 (FIGS. 2 and 3) which directly move the preheated melt-good to a melting tub (not shown) of the glass melting equipment.

Presently one of the heat-exchanger units 11—which are all alike—shall be discussed more comprehensively. The unit comprises an upper and lower frame-like affixing flange 16 which is affixed in vertically flush manner to a support frame 19 consisting of vertical and horizontal shapes 17 and 18. The support frame 19 bears many equidistant hollow heating plates 20 of which the mutual spacing is determined by spacers 21. The hollow heating plates 20 stand on edge and are open on both sides (left and right in FIG. 2), whereas they are sealed by strips 22 at the top and bottom. The spaces or ducts 23 between the heating plates 20 are open at the top and bottom whereas they are sealed laterally. The spaces or ducts 23 of all heat-exchanger units 11 of the plate heat-exchanger 10 are mutually flush vertically and their function is to pass the melt-goods to be preheated, which consist of glass fragments and glass batching. The melt-good to be preheated therefore descends in the form of a plurality of comparatively narrow columns through the plate heat-exchanger 10, the columns also passing through the intermediate units 12.

The melt-good to be preheated is uniformly introduced by an omitted conveyor means into the ducts 23 between the heating plates 20, as a result of which it may slide down within these ducts on account of gravity. When the plate heat-exchanger 10 is started, the vibration conveyors 15 are at rest, and therefore the melt-good can build up gradually in the ducts 23 as filling proceeds. As soon as the ducts 23 are entirely filled with the melt-good, the plate heat-exchanger 10 is started to preheat the melt-good, the operation being carried out "in-line".

Figure 2:
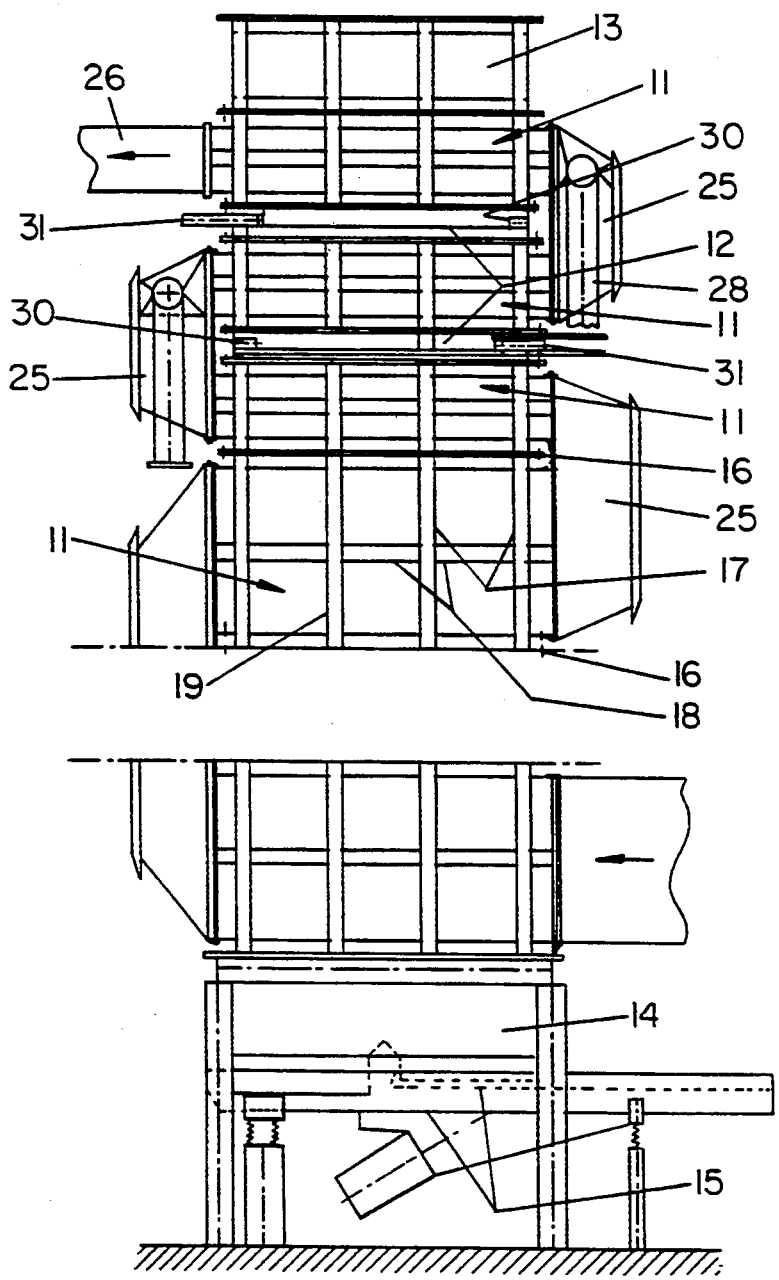
FIG. 2 is a sideview of the upper part of the heat exchanger of FIG. 1, showing of its drying zone and an upper segment of the adjoining preheating zone.

The nine heat-exchanger units 11 of the plate heat-exchanger 10 of FIG. 1 are held vertically flush at their flanges 16 and connected by means of omitted screws. The hollow heating plates 20, as already mentioned, are sealed at the top and bottom and open only on the side. As shown by FIG. 1, a feed conduit 24 for the heating gas is flanged onto the lowermost heat-exchange unit 11. The left sides of the outwardly open hollow heating plates 20 of the two lowermost heat-exchanger units 11 shown in FIG. 1 are connected to each other by a flange-affixed bypass duct 25 for the heating gas. In similar manner a further bypass duct 25 for the heating gas connects the open right sides of the hollow heating plates 20 of the second and third heat-exchanger units 11 as seen from below in FIG. 1. The left open sides of the heating plates 20 of the third and fourth heat-exchanger units 11 seen from below are similarly connected by a further heating-gas bypass-duct 25. In this manner the left and right sides of the hollow heating plates 20 of vertically adjoining heat-exchanger units 11 are alternatingly connected to one another by bypass ducts 25, an exhaust conduit 26 for the heating gas being flange-affixed to the left open side of the hollow heating plates 20 of the uppermost heat-exchanger unit 11. In this manner the heating gas flows horizontally through the heat-exchanger units 11 in alternating directions, as a result of which a meandering heating-gas flow through the plate heat-exchanger is obtained as indicated by the arrows of FIG. 1.

When the plate heat-exchanger 10 is run to preheat the melt-good, heating or flue gas at a temperature between 400° and 700° C. is fed through the feed conduit 24 into the cavities 20a of the heating plates 20 into the heat-exchanger units 11. The heating gas flows upward in meandering manner through the individual heat-exchanger units 11 and leaves the plate heat-exchanger 10 through the exhaust conduit 26, the heating gas gradually cooling on its way from the bottom to the top. As a rule the input material is a moist melt-good, which would tend to form bridges in the ducts 23 during preheating and hence would block the vertical flow of the good: the invention therefore proposes to place a drying zone for the moist melt-good ahead of the preheating zone (FIG. 1). The humidity in the melt-good is evaporated in this drying zone by means of a separate feed of hot heating gas to the already cooled flows of heating gas. At the same time the melt-good passes through cavities in this drying zone, the steam thereby being allowed to escape to the outside to prevent its condensation. Accordingly only dry melt-good which is fluid or friable in problem-free manner arrives at the preheating zone and it easily passes through the relatively narrow ducts 23. A so-called bypass duct 27 leads upward from the heating-gas feed conduit 24 to form the drying zone in the upper, i.e., input region of the plate heat-exchanger 10 and branches into two feed conduits 28 of relatively lesser inside diameters. One of the feed conduits 28 issues into the upper part of the right, uppermost bypass duct 25 of FIG. 1 and the other feed conduit 28 issues into the upper part of the left uppermost bypass duct 25 of FIG. 1. The hot heating-gas partial flows entering the cited bypass ducts 25 mix therein with the already comparatively much cooled main flow of heating gas which they heat to so high a temperature that when this mixture of heating gases passes through the cavities 20a in the heating plates 20 of illustratively the three upper heat-exchanger units 11 (of comparatively low heights) the moisture entrained by the melt-good shall evaporate. To the extent the steam is present in the ducts 23 of the uppermost heat-exchanger unit 11, it can escape upward and to the outside. The steam generated in the ducts 23 of the adjoining lower heat-exchanger units 11 can enter the cavities of the intermediate units 12. The steam is evacuated from these intermediate units 12 and accordingly it cannot condense and the melt-good, as already mentioned above, arrives at the preheating zone in a problem-free, fluid state.

Channel-shaped bodies, for instance in the form of H-bars 29, are integrated into each intermediate unit 12 to evacuate the steam. In the illustrative embodiment mode, the H-bars 29 are supported by square pipes 30 and 31 affixed to the end walls 32 of the intermediate units 12. The pipes 31 are open to the outside, but the pipes 30 are closed.

Figure 3:
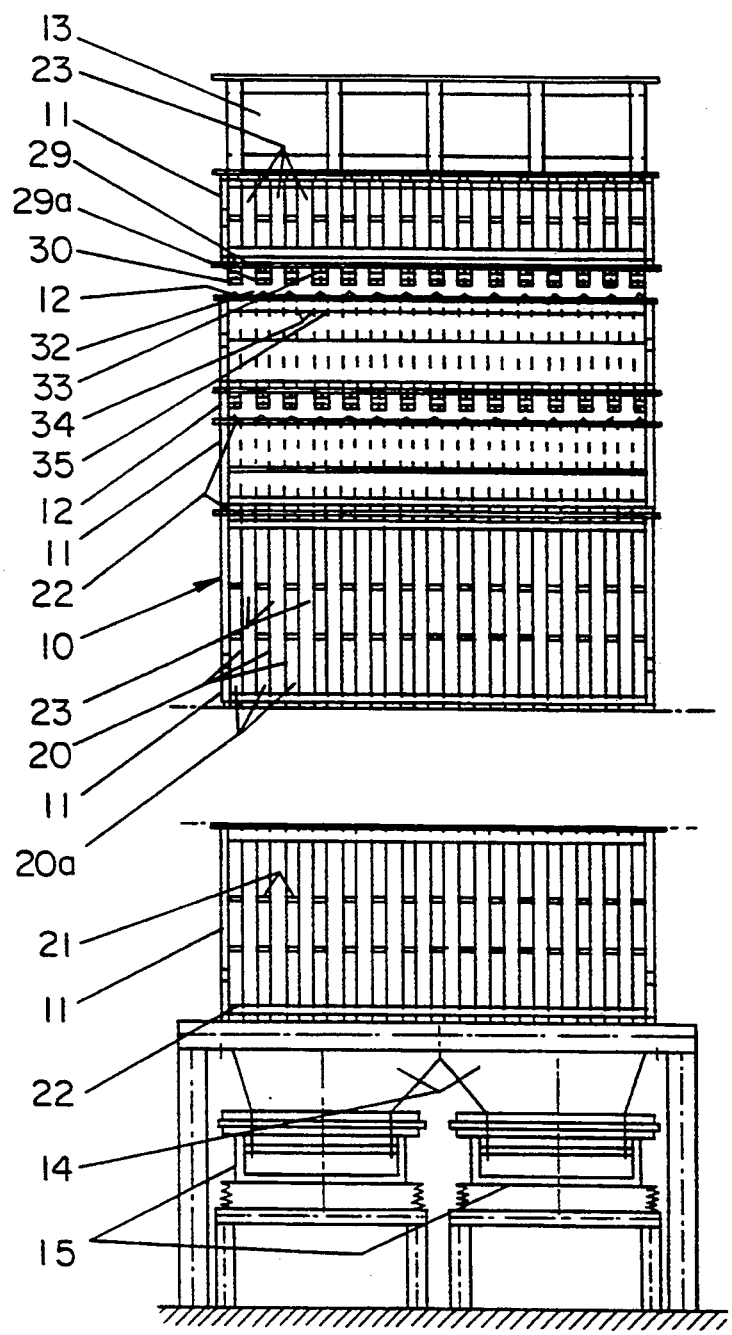
FIG. 3 is a front view of the part shown in FIG. 2 in the direction of the arrow A without the bypass ducts, in partly cutaway form, to elucidate the steam evacuation by means of the H-bars.

FIG. 3 shows that the H-bars 29 each are mounted in a plane between two hollow heating plates 20 of vertically adjacent heat-exchanger units 11. The cross-sectional width of the H-bars 29 corresponds to that of the heating plates 20 and thereby substantially to the width of the hot heating-gas guidance-cavities 20a in the heating plates 20. The arrangement furthermore is such that the H-bars 29 adjoin by the upper edges of their legs 33 the closed underside of the heating plates 20. Furthermore, in this embodiment, for instance angle irons 34 are mounted prone in the intermediate units 12 while being vertically spaced from but parallel to the H-bars 29. These angle irons 34 are affixed by their ends to the end walls 32 of the intermediate units 12. The angle irons 34 are vertically flush on the heating plates 20 of the particular next lower heat-exchanger unit 11. The two legs of each angle iron 34 form guides for the melt-good passing through the intermediate units 12 which they guide into the ducts 23 of the next lower heat-exchanger unit 11.

In the illustrative embodiment mode, the drying zone begins at a depth of approximately 1–2 m. Depending on circumstance, and in deviation from the embodiment mode, more than three intermediate units 12 may be provided to evacuate the steam. Again, a single intermediate unit 12 also may suffice. In lieu of the H-bars 29, other channel-shaped bodies of which the underside is open, perforated or slotted, may be used for steam evacuation. When the ducts 23 for melt-good transmission in the heat-exchanger units 11 are sufficiently wide, the steam-evacuating channel-shaped bodies also may be integrated in such manner in these ducts that they will be bypassed by the descending melt-good.

When being evacuated to the outside, the steam may be fed through pipe segments 31 into collecting conduits 35 which may issue into the exhaust conduit 26 for the cooled heating or flue gas. This feature offers the advantage that only one conduit is needed to evacuate the cooled heating or flue gas and the steam.

As an illustrative embodiment, a plate heat-exchanger 10 was selected that is constituted of individual heat-exchanger units 11 in the so-called modular way. However the invention also applies to a plate heat-exchanger 10 which is a single unit onto which are mounted the means supplying the hot heating gas and evacuating steam. In that case the latter two means will then form the drying zone which is followed in the downward direction by the preheating zone consisting of a single unit.

We claim:

1. A method for preheating a melt-good, i.e., goods to be melted, consisting of broken glass and glass batching, by using a heating gas, wherein the melt-good vertically descends by gravity in a plurality of narrow columns and during this descent is preheated in the course of indirect heat-exchange by flows of heating gas moving in the opposite direction, the temperature of the melt-good columns increasing from the top toward the bottom whereas the temperature of the hot-gas flows gradually decreases from the bottom toward the top, characterized in that the preheating stage is preceded by a drying stage for moist melt-goods during which a separate feed of hot heating gas into the already cooled heating-gas flows evaporates the moisture, and in that the melt-good columns so heated are made to pass through cavities through which the steam may escape to the outside in such manner that its condensation shall be precluded and only dry, fluid or friable melt-good arrives at the preheating stage.

* * * * *